United States Patent Office 3,526,549
Patented Sept. 1, 1970

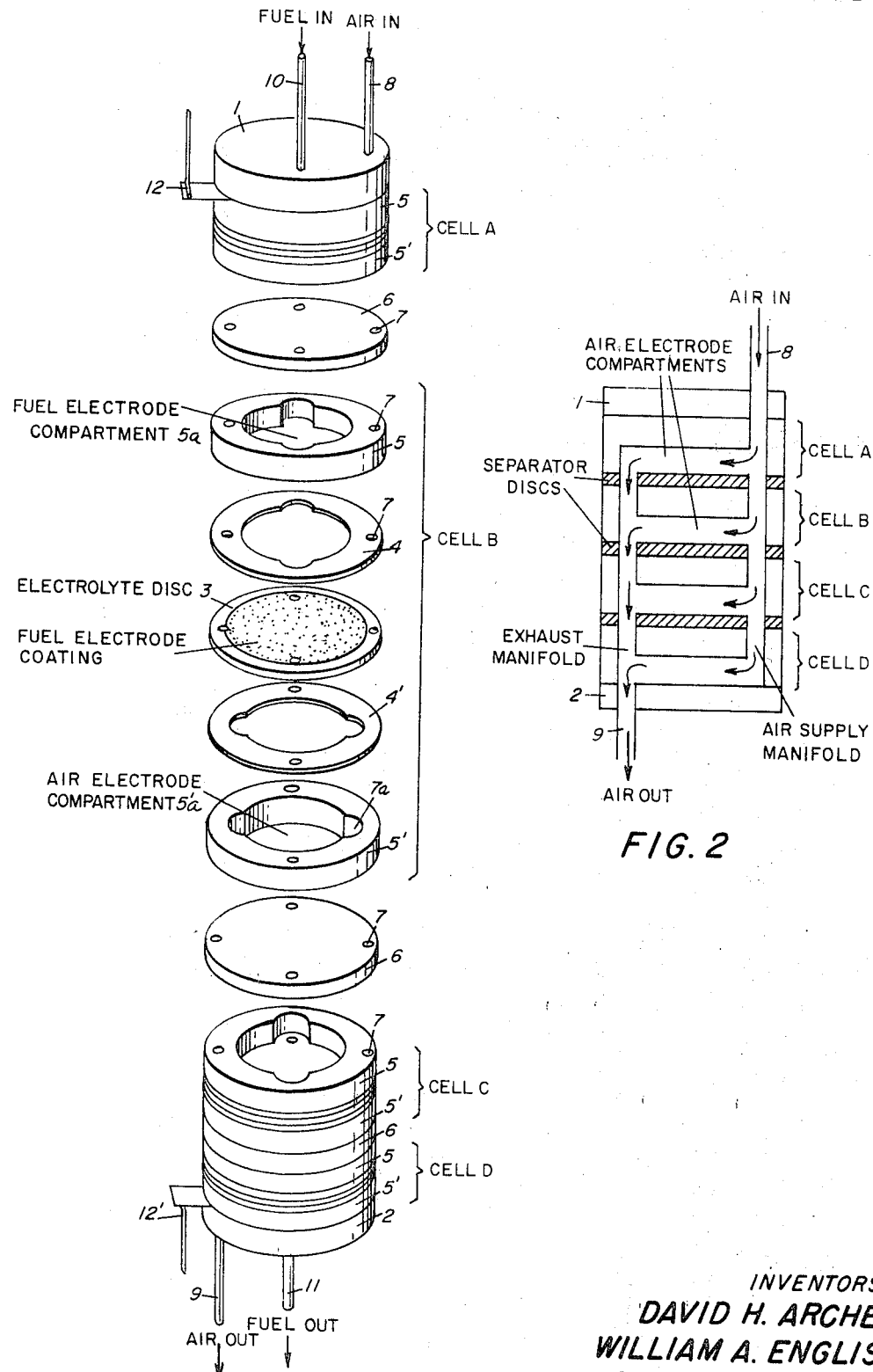

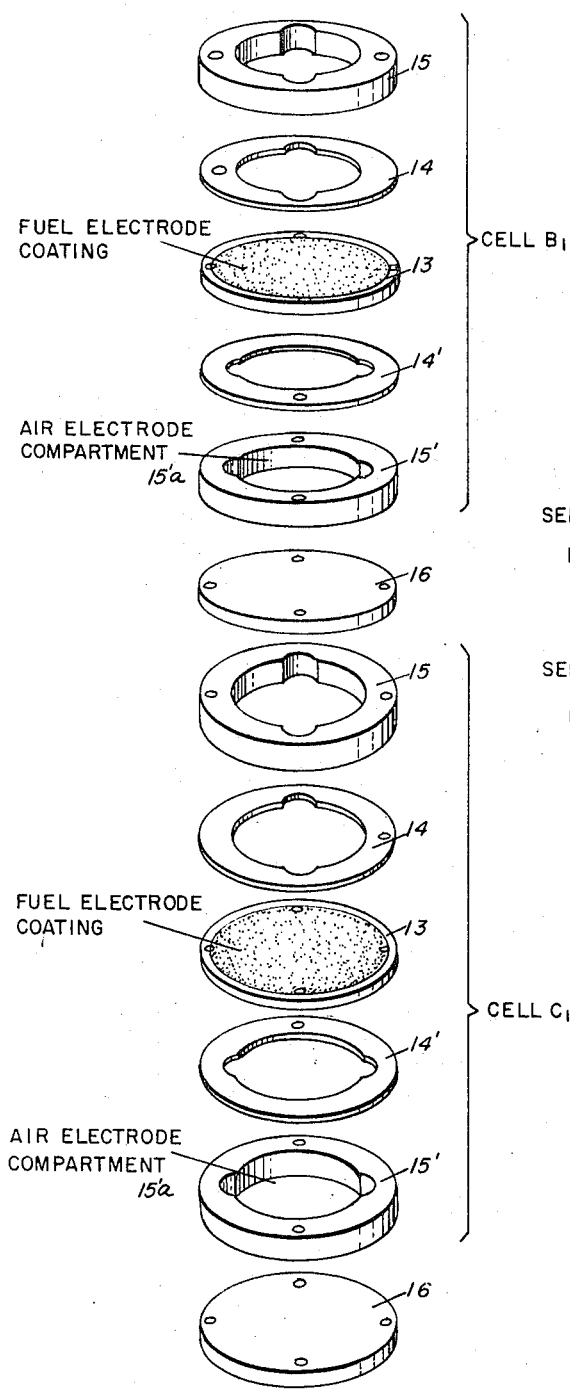
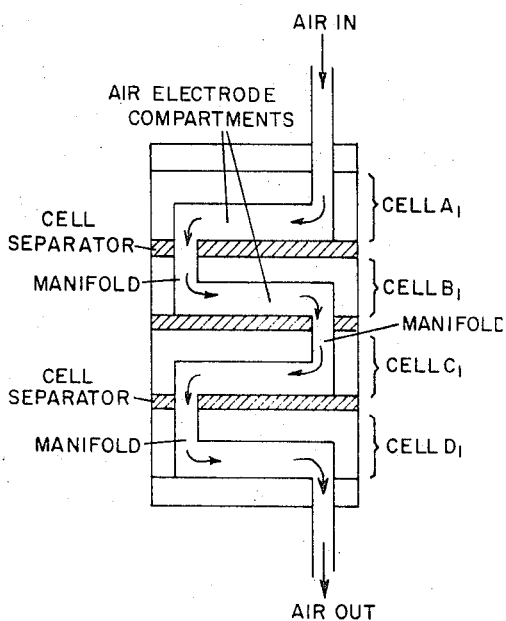
FIG.3
FIG.4

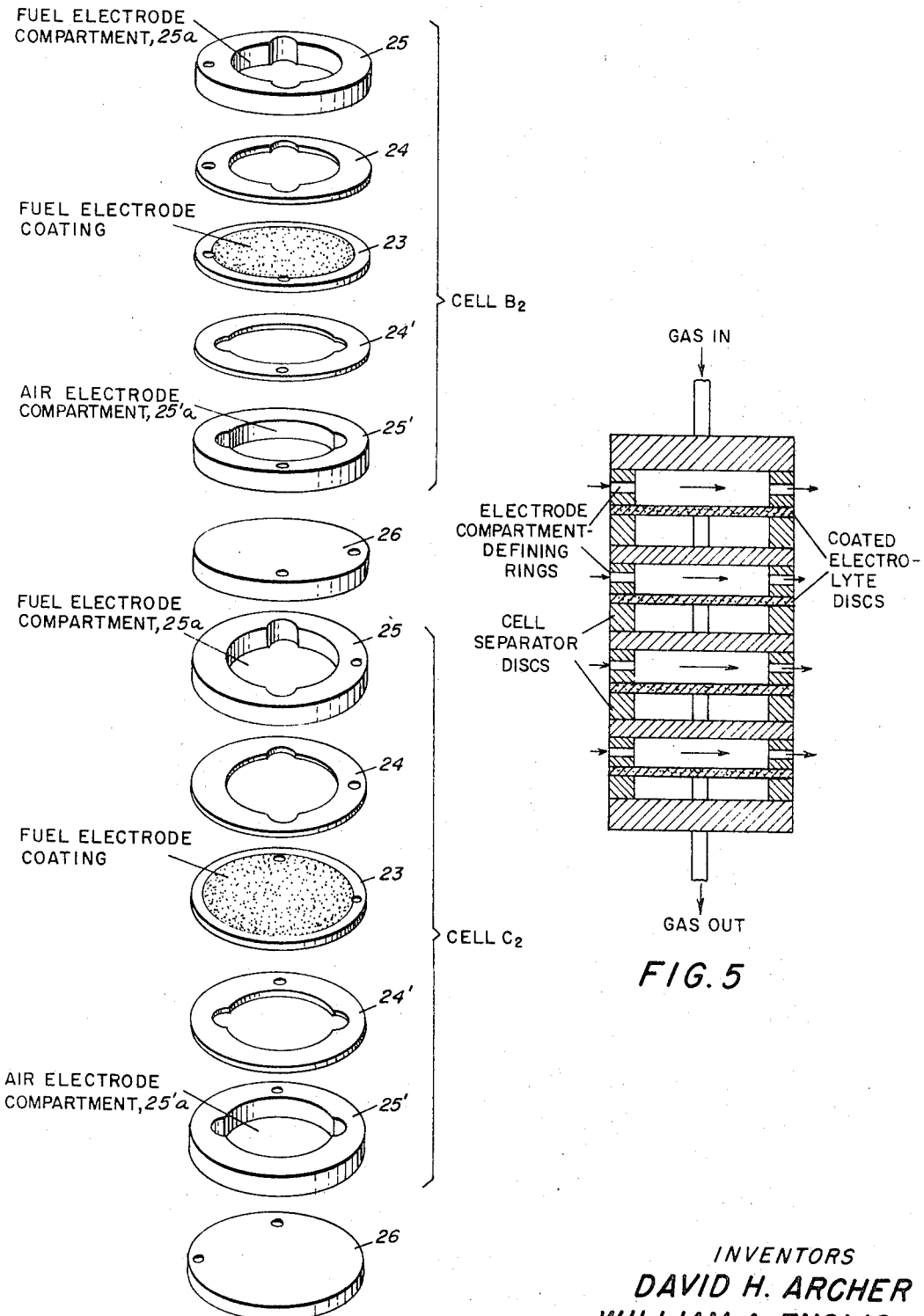

3,526,549
SOLID ELECTROLYTE STACKED DISC FUEL CELLS
David H. Archer, Pittsburgh, and William A. English, Export, Pa., and Peter S. Merrill, San Diego, Calif., assignors, by mesne assignments, to the United States of America as represented by the Secretary of the Interior
Filed Apr. 9, 1968, Ser. No. 719,909
Int. Cl. H01m 27/16
U.S. Cl. 136—86      1 Claim

ABSTRACT OF THE DISCLOSURE

Each fuel cell of a stacked, solid electrolyte battery is composed of an electrolyte disc covered on each face with an electrode coating and sandwiched between two rings each of which defines an electrode compartment. Electrically conductive discs separate one cell from another. The separator discs, electrolyte discs and rings have aligned apertures which define manifolds that provide for parallel or series flow of fuel and oxidant gas through the battery.

---

This invention, which relates to fuel cell construction, resulted from work done under Contract 14–01–0001–303 with the Office of Coal Research of the Department of the Interior. In accordance with the requirements of the Coal Research Act [30 U.S.C. 661–666 (1964)], the domestic title to the invention is in the Government.

Fuel cells are relatively simple devices which convert chemical energy into electricity. Due to such factors as their lightness, extremely high efficiency and compactness, solid electrolyte fuel cells have become valuable devices in modern technology.

To increase their effectiveness, they are usually connected in series forming a battery or stacked unit. We have now developed a new and improved stacked unit. Generally, each cell in the stacked unit comprises (a) a disc fabricated of solid electrolyte, (b) an electrode coating substantially covering each disc face, and (c) two rings sandwiching the coated disc therebetween, the diameter of the rings being approximately equal to the electrolyte disc diameter. A fuel electrode compartment and oxygen electrode compartment are defined by the rings on opposite sides of the disc. Ring-shaped electrically conductive gaskets can be interposed between each electrode coating and its adjacent ring to prevent physical contact therebetween. In the stacked unit, electrically conductive discs separate one cell from another. A plurality of aligned apertures in the coated electrolyte discs, compartment-defining rings, ring gaskets and separator discs define manifolds in the stacked unit for injecting and removing fuel and oxidant gases to and from the cells. Depending on the arrangement of apertures in the fuel cell components, the stacked unit can provide for series or parallel flow of gases or liquids to and from the cells. Electrical contact between cells can be established by employing external conductors rather than electrically conductive compartment-defining rings and separator discs.

It is therefore an object of this invention to provide an improved compact, solid electrolyte fuel cell battery. A further object is to provide a stacked unit for parallel flow of fluids therethrough. Another object is to provide a stacked unit for series flow of fluids. A still further object is to provide a parallel flow unit which can be readily converted to series flow.

Other objects and advantages will be obvious from the detailed description of the invention appearing in the specification taken in conjunction with the drawings in which:

FIG. 1 is a partially exploded view of an embodiment of the stacked unit of the present invention which provides for parallel feed and removal of gases to and from the plurality of cells in the stack.

FIG. 2 is a schematic view of the flow of air through the stacked unit of FIG. 1.

FIG. 3 is an exploded fragmentary view of a modified version of the stack shown in FIG. 1.

FIG. 4 is a schematic view of the flow of air through the stacked unit of FIG. 3.

FIG. 5 is a schematic view of a modification of the stacked units of FIG. 1 or 3.

FIG. 6 is an exploded fragmentary view of an alternative embodiment of the stacked unit of FIG. 3.

Referring to FIG. 1, therein is shown a battery having a stack of cells A, B, C and D sandwiched between end blocks 1 and 2. Any number of cells can obviously be employed in the stack. Cell B, shown in an exploded manner, is identical to the other cells and includes a solid electrolyte disc 3 which is composed of, for example, zirconium oxide electrolyte. A porous fuel electrode coating of a noble metal such as platinum or an oxidation resistant metal such as copper, nickel, or cobalt is integrally bonded to the upper face of the disc while a porous oxygen or air electrode coating of a noble metal such as platinum, an oxidation resistant metal such as silver or a conductive oxide such as tin oxide or indium oxide is bonded to its lower (hidden) face. Adjacent the fuel and air electrodes are electrically conductive ring-shaped gaskets 4 and 4', respectively.

A pair of ring-shaped current collectors 5 and 5' sandwich the coated disc and gaskets therebetween, which rings can be fabricated entirely of electrically conductive material or can simply contain electrically conductive wires or regions. By this arrangement, a fuel electrode compartment 5a is defined adjacent the fuel electrode layer by ring 5 while ring 5' defines an air electrode compartment 5'a adjacent the air electrode.

All the intermediate cells (cells B and C) in the stack are each sandwiched between a pair of electrically conductive separator discs 6. To complete this basic structure, each terminal cell A and D is sandwiched between a cell separator disc 6 and one of the end blocks 1 and 2. Each separator disc in the stack is shared by two cells and separates electrode compartments of opposite polarity from one another.

Rather than employing separate and distinct components in the stack, the separator discs 6 can be physically combined with either or both of the adjacent compartment-defining current collector rings to form a single piece. Further, if it is desired to fabricate the compartment-defining rings and cell separator discs from nonconductive material, the cells can be electrically connected to one another by external wires or other conductors which are physically connected to appropriate cell electrodes or conductive ring-shaped gaskets.

Each cell component as shown in FIG. 1 and each cell separator disc 6 has a hole-type aperture 7 or notch-type aperture 7a on its right side which apertures are aligned with one another to define, in the stack, an air supply manifold in fluid communication with the air electrode compartments. Air is supplied to the manifold by tube 8 in end block 1 and passes into the air electrode compartment in each cell to contact the air electrode coating on the lower face of each electrolyte disc.

Likewise, a series of aligned apertures on the left side of the stack components as shown in FIG. 1 define an exhaust manifold in fluid communication with the air electrode compartments to remove gases therefrom and pass the same to exhaust tube 9 in end block 2. By this arrangement, as schematically shown in FIG. 2, oxidant gas (such as air) and oxygen-depleted gas flows through the stack in parallel to and from each cell.

Similarly, referring again to FIG. 1, fuel enters the stack through tube 10 in end block 1, passes through a fuel supply manifold defined by a series of aligned apertures in the front of the cell components as shown in the figure, and passes from the manifold to each fuel electrode compartment. Combustion products pass from each fuel electrode compartment to an exhaust manifold defined by a series of aligned apertures in the rear of the cell components as shown in the figure, and the products exit from the stack through tube 11 in end block 2. Fuel and combustion products flow through the stack in the same parallel manner as shown for air in FIG. 2.

Conductors 12 and 12', each sandwiched between a terminal ring-shaped current collector and one of the end blocks 1 and 2, deliver the current generated by the cells to the surroundings where electrical energy is utilized.

Mechanical components such as a special framework or tie bolts extending between end plates outside the stack or through additional holes drilled through the periphery of the stack components can be employed to hold the unit together. In the latter case, electrical contact must be prevented between bolts and stack components. Alternatively, an adhesive or cement-like material applied on the contacting surfaces between components or on the exterior surfaces of the stack can be employed. In view of the cell design, all components in the cell which have the same function can be identically fabricated. Further, discs, rings and gaskets of other shapes can obviously be employed in place of the illustrated circular components.

Referring to FIG. 3, therein is shown a modification of the parallel flow unit of FIG. 1 whereby the unit has been converted for serial flow of gases or other fluids through the plurality of cells. In the drawing, the design and relative positions of the separator discs 16, coated electrolyte discs 13 and collector rings 15 and 15' in each cell are identical to the design and relative positions of these components in FIG. 1. However, the cell gaskets 14 and 14' have been modified. As a result of the aperture arrangement in the modified gaskets, air and fuel will flow serially through the stack. For example, in cell $B_1$ as shown in FIG. 3 the aligned apertures on the left side of gaskets 14 and 14', rings 15 and 15' and electrolyte disc 13 define a manifold for passage of air to the air electrode compartment 15'a therein. The absence of an aperture on the left side of gasket 14 in cell $C_1$ prevents the further downward passage of air directly from this left side manifold in cell $B_1$ to the next air electrode compartment 15'a in cell $C_1$. Instead, all the gases in the left side manifold of cell $B_1$, before entering the air electrode compartment 15'a in cell $C_1$, must pass through air electrode compartment 15'a in cell $B_1$. Fluid connection between the air electrode compartments in cells $B_1$ and $C_1$ is then provided by a manifold defined by a series of aligned apertures in the right side of (a) the cell $C_1$ components, (b) disc 16 between cell $B_1$ and $C_1$, and (c) ring 15' of cell $B_1$. FIG. 4 schematically shows the flow path of air through this unit. Fuel flows through the stack in the same manner by means of apertures in the front and rear of the components as shown in FIG. 3.

Alternatively, by replacing only some of the gaskets in FIG. 1 with those shown in FIG. 3, the stacked unit will provide for both parallel and series flow of gases therethrough. A variety of flow patterns can be established by simply employing different gaskets or by varying the position of specially designed gaskets. Still further, as shown schematically in FIG. 5, ports can be provided in the side of the compartment-defining rings on the air electrode or fuel electrode side of each cell to allow surrounding air or fuel, as the case may be, to flow therethrough.

A further modification of the stacked unit is shown in FIG. 6 wherein the current collectors, electrolyte discs, etc. provide for a permanent series flow battery. Two intermediate cells $B_2$ and $C_2$ are shown in an exploded manner and it will be seen that the electrode-coated electrolyte discs 23, the gaskets 24, 24' and the electrically conductive separators 26, each require two less orifices while the ring-shaped current collectors 25, 25' require one less orifice than required in these respective components in the parallel flow stacked unit of FIG. 1. Referring more specifically to the structure, aligned apertures in the left side of the cell $B_2$ components define a manifold which supplies air to air electrode compartment 25'a therein. From compartment 25'a in cell $B_2$ air flows to the air electrode compartment 25'a in cell $C_2$ via a manifold defined by a series of aligned apertures in the right side of (a) the cell $C_2$ components, (b) disc 26 between cells $B_2$ and $C_2$, and (c) ring 25' in cell $B_2$. Similarly, aligned apertures in the front of the cell $B_2$ components as shown, and in the rear of the cell $C_2$ components define the fuel flow path through these cells. The result is a fuel and air flow pattern in the manner as shown for air in FIG. 4.

In the battery of the present invention, which provides for continuous concurrent or countercurrent flow of air and fuel throughout the unit, external electrical insulation between opposite polarity components within each cell is not required since the electrolyte disc itself functions in this manner. Our cell construction also provides for the ready removal and replacement of electrolyte discs. Further, the unit design eliminates the need for external manifolding to conduct gases from cell to cell.

Although the particular apparatus herein described is well adapted to carry out the objects of the present invention, it is to be understood that various modifications and changes may be made all coming within the scope of the following claim.

What is claimed is:
1. A solid electrolyte fuel cell battery comprising a plurality of stacked fuel cells; a plurality of electrically conductive discs in said stack, each disc separating one cell from another; each of said cells comprising
  (a) a disc fabricated of solid electrolyte, the diameter of said electrolyte disc being about equal to the diameter of said separator discs;
  (b) an electrode coating substantially covering each face of said electrolyte disc, one of said electrodes being a fuel electrode, the other being an oxygen electrode;
  (c) two electrically conductive rings sandwiching said coated electrolyte disc therebetween, the diameter of said rings being about equal to the diameter of said coated disc; the ring adjacent said fuel electrode defining a fuel electrode compartment, the ring adjacent said oxygen electrode defining an oxygen electrode compartment; each of said rings being adjacent one of said separator discs; and wherein there are a plurality of aligned apertures in said rings, separator discs and coated electrolyte discs, said aligned apertures defining manifolds in said battery which are in fluid communication with both compartments in each of said cells, and so constructed to convey gases in parallel to and from said plurality of cells; and
  (d) an electrically conductive ring-shaped gasket between each electrode coating and its adjacent compartment defining ring, said gaskets having apertures, which, in combination with said aligned apertures, effect series flow of gases to said both compartments in each of said cells.

References Cited

UNITED STATES PATENTS

| | | |
|---|---|---|
| 2,767,135 | 10/1956 | Juda et al. |
| 3,012,086 | 12/1961 | Vahldieck _____ 136—86 |
| 3,146,131 | 8/1964 | Linden et al. _____ 136—86 |
| 3,331,706 | 7/1967 | Jenkins _____ 136—86 |
| 3,442,714 | 5/1969 | Matsuno _____ 136—86 |

FOREIGN PATENTS 1,508,147  11/1967  France.

ALLEN B. CURTIS, Primary Examiner